United States Patent
Persson et al.

(10) Patent No.: US 9,499,207 B2
(45) Date of Patent: Nov. 22, 2016

(54) FRONT STRUCTURE ARRANGEMENT OF A VEHICLE

(71) Applicant: VOLVO CAR CORPORATION, Gothenburg (SE)

(72) Inventors: Hakan Persson, Gothenburg (SE); Tom Stoddart, Molndal (SE); Weijia Wu, Gothenburg (SE); Oscar Jesus Centeno Gil, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/565,760

(22) Filed: Dec. 10, 2014

(65) Prior Publication Data

US 2015/0166108 A1 Jun. 18, 2015

(30) Foreign Application Priority Data

Dec. 18, 2013 (EP) .................................. 13197919.7

(51) Int. Cl.
| | |
|---|---|
| *B62D 21/15* | (2006.01) |
| *B60R 21/00* | (2006.01) |
| *B62D 25/08* | (2006.01) |

(52) U.S. Cl.
CPC ............. *B62D 21/152* (2013.01); *B60R 21/00* (2013.01); *B62D 25/088* (2013.01); *B60R 2021/0004* (2013.01)

(58) Field of Classification Search
CPC .. B62D 21/152; B62D 25/088; B60R 21/00; B60R 2021/0004
USPC ............ 296/187.09, 187.01, 187.03, 193.09, 296/203.02
See application file for complete search history.

(56) References Cited

U.S. PATENT DOCUMENTS

| | | | |
|---|---|---|---|
| 7,762,568 B2 * | 7/2010 | Tatsumi ............... | B62D 25/088 280/124.137 |
| 2010/0026047 A1 * | 2/2010 | Baccouche .......... | B62D 21/152 296/187.09 |
| 2011/0095568 A1 * | 4/2011 | Terada .................. | B62D 21/11 296/187.09 |

(Continued)

FOREIGN PATENT DOCUMENTS

| | | | | |
|---|---|---|---|---|
| DE | WO 2007019935 A1 * | 2/2007 | ........... | B62D 25/088 |
| DE | 102005043948 A1 | 4/2007 | | |

(Continued)

OTHER PUBLICATIONS

Extended European Search Report Dated May 27, 2014, Application No. 13197919.7-1757, Applicant Volvo Car Corporation, 6 Pages.

*Primary Examiner* — Jason S Morrow
*Assistant Examiner* — E Turner Hicks
(74) *Attorney, Agent, or Firm* — Brooks Kushman P.C.

(57) ABSTRACT

The present disclosure relates to a front structure arrangement of a vehicle including a side member and an outer side member arranged in a longitudinal direction of the vehicle at a left-side portion or a right-side portion of a front portion of the vehicle, the outer side member being located laterally outward of and vertically above the side member. A spring tower is attached to the side member and to the outer side member, and the spring tower is adapted to support a suspension of the vehicle. The spring tower is attached to the side member by an attachment means, which is arranged such that the spring tower is adapted to detach progressively from the side member during bending of the side member when the front structure arrangement is subjected to a substantially longitudinal force.

21 Claims, 4 Drawing Sheets

(56) References Cited

U.S. PATENT DOCUMENTS

2012/0205944 A1* 8/2012 Kido ............... B62D 25/088
   296/187.09
2013/0169003 A1* 7/2013 Kubo ............... B62D 21/152
   296/187.09

FOREIGN PATENT DOCUMENTS

| DE | 102012018693 A1 | 3/2013 |
| EP | 1834862 A1 | 9/2007 |
| WO | 2007019935 A1 | 2/2007 |

* cited by examiner

FRONT STRUCTURE ARRANGEMENT OF A VEHICLE

CROSS-REFERENCE TO RELATED APPLICATIONS

This application claims foreign priority benefits under 35 U.S.C. §119(a)-(d) to European patent application number EP 13197919.7, filed Dec. 18, 2013, which is incorporated by reference in its entirety.

TECHNICAL FIELD

The present disclosure relates to a front structure arrangement of a vehicle, wherein the front structure arrangement comprises a side member, an outer side member and a spring tower. The disclosure further relates to a front structure of a vehicle comprising two such front structure arrangements.

BACKGROUND

When a vehicle, such as a car, is involved in a frontal collision, the collision impact is, at least partly, absorbed by a front structure arrangement of the vehicle. It is therefore desirable, that the front structure arrangement is adapted in such a way that the vehicle occupants are subjected to no or as little risk of injury as possible.

Patent document EP 1834862 A1 discloses a vehicle front body structure comprising a bridge-shaped frame member disposed on a front side frame in front of a spring tower so as to extend vertically and stride over an engine mount. Accordingly, there can be provided a vehicle front body structure that can attain a proper energy absorption of the front side frame with its axial compression at a vehicle crash.

SUMMARY

An object of the present disclosure is to overcome or ameliorate at least one of the disadvantages of the prior art, or to provide a useful alternative.

Thus, in a first aspect of the present disclosure there is provided a front structure arrangement of a vehicle. The front structure arrangement comprises:
  a side member arranged in a longitudinal direction of the vehicle at a left-side portion or a right-hand portion of a front portion of the vehicle;
  an outer side member arranged in the longitudinal direction of the vehicle at the left-side portion or the right-hand portion of the front portion of the vehicle, the outer side member being located laterally outward of and vertically above the side member; and
  a spring tower attached to the side member and to the outer side member, the spring tower being adapted to support a suspension of the vehicle.

The spring tower is attached to the side member by an attachment means, which is arranged such that the spring tower is adapted to detach progressively from the side member during bending of the side member, when the front structure arrangement is subjected to a substantially longitudinal force.

Terms related to directions as used herein, such as longitudinal, transverse, lateral, vertical and outwards, refer to the front structure arrangement as mounted in a vehicle, which is assumed to stand on flat ground. Terms related to positions, such as in front of, behind or beside, also refer to the front structure arrangement as mounted in a vehicle, which is assumed to stand on flat ground.

The substantially longitudinal force may arise when the vehicle, wherein the front structure arrangement is mounted, is subjected to a collision being at least partly frontal. The vehicle may e.g., be involved in a full frontal collision or an offset frontal collision. If the vehicle is involved in a full frontal collision, the spring towers at both the left-side portion or the right-hand portion of the front structure may be affected. If instead the vehicle is involved in an offset frontal collision, i.e., there is an impact at only a portion of the front structure, the side member at the side portion of the front structure where the impact occurs may bend and thereby displace the spring tower located at that side portion of the vehicle.

The substantially longitudinal force causes the side member to bend, when absorbing the force. As the side member bends, the spring tower may be arranged to detach progressively, i.e., the detachment develops gradually over a period of time. The detachment may develop continuously or step-wise, e.g., dependent on type and configuration of attachment means.

The attachment means may be a breakable attachment means, which is arranged to break at a predetermined breaking force. Further, the size of the predetermined breaking force may vary along the attachment of the spring tower to the side member, e.g., to provide a preferred starting point for the detachment of the spring tower from the side member.

The spring tower may be arranged to move laterally outwards and/or longitudinally rear-wards in relation to the rest of the vehicle during bending of the side member. Thereby the spring tower, which may be more rigid than e.g., the side member and the outer side member, is moved at least partly out of the way, such that a vehicle occupant is subjected to no or as little risk of injury as possible. The spring tower being more rigid means that it is less prone to deformation and/or compression than e.g., the side member. This may be due to the shape, choice of material and/or thickness of material. The side member may be predesigned for bending, as described below.

The progressive detachment may, in principle, start anywhere along the attachment between the spring tower and the side member. However, it may be preferable to arrange the attachment means, such that the progressive detachment starts at either the rearward-facing side of the spring tower or the forward-facing side of the spring tower, since the detachment will then only progress in one direction, forwards respectively rearwards.

The attachment means may be arranged to provide the progressive detachment of the spring tower from the side member starting at a rearward-facing side of the spring tower and progressing in a forward direction of the vehicle. This may help to displace the spring tower laterally outwards and/or longitudinally rearwards in relation to the rest of the vehicle during bending of the side member.

As an alternative, the attachment means may be arranged to provide the progressive detachment of the spring tower from the side member starting at a forward-facing side of the spring tower and progressing in a rearward direction of the vehicle.

The front structure arrangement may be arranged such that the bending of the side member cooperates with the detachment of the spring tower, such that increased bending of the side member allows further progressing of the detachment of the spring tower, thereby allowing the spring tower to move further laterally outwards, while the further progressing of the detachment of the spring tower allows the side member to increase bending and so on. More bending thus allows further detachment and vice versa.

The spring tower may be more rigid than the side member, such that the side member starts to bend before the spring tower starts to deform, when the front structure arrangement is subjected to the substantially longitudinal force.

The attachment means may comprise discrete attachment members, such as rivets, screws, bolts or spot-welds. Welding may be suitable when the materials of the spring tower and the side member are of the same type, e.g., steel. When two different material types are used, e.g., a spring tower of aluminum and a side member of steel, discrete attachment members adapted to combine different materials may be used, such as rivets, screws and/or bolts. These discrete attachment members may also be suitable when the materials of the spring tower and the side member are of the same type.

A strength of the attachment means, i.e., a degree of attachment, may be variable along the attachment between the spring tower and the side member. Thereby, e.g., a suitable starting point for the detachment may be selected. The strength may be varied along the attachment means e.g., by varying the number and distribution of discrete attachment members per area unit and/or by varying the strength of the discrete attachment members. The discrete attachment members may be located wherever it is suitable along the attachment means. They may be evenly or unevenly distributed over the attachment means.

The degree of attachment may be controlled by altering the number of discrete attachment members, the individual attachment area of each discrete attachment member and/or a strength of an individual attachment member, e.g., by varying its size. The strength of the attachment means is further preferably selected such that the attachment means is deigned to detach at a lower force than a force needed to break the side member, outer side member or an optional cross member of the vehicle, such as a rally bar.

As an alternative, or as a complement, to discrete attachment members, the attachment means may comprise a continuous attachment member, such as a glue string or a continuous weld.

The front structure arrangement may further comprise a crash box located at a front end of the side member, the side member being arranged, dimensioned and/or shaped to bend substantially after the crash box has been compressed, when the front structure arrangement is subjected to the substantially longitudinal force. Thereby, the side member does not start to bend until the crash box has been fully compressed, i.e., no time-wise overlap, or the side member starts to bend at the end of the compression of the crash box, i.e., a slight time-wise overlap.

The side members may be arranged to at least partly bend laterally in relation to a longitudinal center-line of the vehicle, preferably more laterally than downwards, more preferably substantially laterally. By bending laterally, the center of mass of the side member may be moved laterally outwards. Since the side member bends laterally, it can help to displace another component, such as a spring tower, laterally outwards, thereby moving at least partly out of the way, such that a vehicle occupant is subjected to no or as little risk of injury as possible. Further, depending on the structure of the front structure of the vehicle, there may be more space available for substantially lateral bending, instead of substantially vertical bending.

The side member may further comprise a triangular support at its rear end. The triangular support may help to promote lateral bending of the side member, while at the same time the triangular support may be adapted to prevent vertical bending, e.g., by being stiff in that direction.

In order to bend in a desired way, the side member may comprise at least one predetermined bend zone, preferably an uneven number of predetermined bend zones, most preferably three predetermined bend zones. If using three bend predetermined bend zones, the side member can be configured to bend like a V, thereby helping to displace other components, such as the spring tower, laterally outwards.

If using an uneven number of predetermined bend zones, the attachment means may be arranged such that the detachment of the spring tower from the side member starts at an inward bend of the side member, i.e., a bend directed towards the longitudinal center line of the vehicle. The predetermined bend zones may then be located such that a bend zone for inward bending is located at, or in the vicinity of, the rearward-facing side of the spring tower. Thereby the detachment may start at the inward bend and eventually there will be a large displacement between the spring tower and the inward bend of the side member as a result of the bending of the side member.

If the side member comprises three predetermined bend zones, the detachment of the spring tower may be arranged to start at a third predetermined bend zone being located along the side member rearward of the other two predetermined bend zones. The location of the predetermined bend zone may then be selected to obtain a desired displacement of the spring tower in an outwards and/or rearwards direction.

It may be appropriate to locate the discrete attachment members, such that the predetermined bend zones are free from discrete attachment members, since otherwise a discrete attachment member could locally influence the bending properties. Purely as an example, it would be difficult to bend the side member along a vertical line extending through a rivet.

The front structure arrangement may comprise a front closer located in front of the spring tower and/or a rear closer located behind the spring tower, the front closer and/or rear closer being attached to the spring tower, the side member and/or the outer side member.

The front closer is adapted to at least partly close the space between the spring tower, the side member and the outer side member in front of the spring tower. The rear closer is adapted to at least partly close the space between the spring tower, the side member and the outer side member behind the spring tower.

In a second aspect of the present disclosure, there is provided a front structure of a vehicle comprising:
  a front structure arrangement as set out herein at a left-side portion of the front portion of the vehicle, and
  a front structure arrangement as set out herein at a right-side portion of the front portion of the vehicle.

As an option, the front structure may comprise:
  a bar connecting the spring tower of the left-side portion and the spring tower of the right-side portion, e.g., a rally bar, a portion of the plenum or a portion of the body back-up structure, the bar being adapted to be released at at least one end from at least one of the spring towers, when the at least one side member bends.

If the vehicle is involved in a full frontal barrier impact, both side members may bend. When at least one side member bends, it pushes the corresponding spring tower outwards. The bar, having a fixed length, is then released at least at one of the ends, such that the bar does not obstruct the detachment of the spring tower and/or the bending of the side member.

Since the bar is adapted to release, it will not obstruct the detachment of the spring tower and/or the bending of the side member. The bar may connect a fixation means of the left-hand spring tower to a corresponding fixation means of the right-hand spring tower. The bar may be adapted at at least one of the ends, such that it may easily be released from at least one of the spring towers, e.g., be designed to easily slip out from the fixation means. As an alternative, or a complement, the fixation means may be prepared to easily break, thereby releasing the bar from at least one of the spring towers. Preferably, the bar is adapted to be released at both ends.

If there is any other cross member in the vehicle connecting the left-hand front structure arrangement to the right-hand front structure arrangement, such a cross member is preferably designed in such a way that it does not obstruct the detachment of the spring tower and/or the bending of the side member. The cross member may e.g., be detachable similar to as described above for the bar.

In a third aspect of the present disclosure, there is provided a vehicle comprising the above-described front structure arrangement or the above-described front structure.

BRIEF DESCRIPTION OF THE DRAWINGS

The present disclosure will hereinafter be further explained by means of non-limiting examples with reference to the below drawings, wherein.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
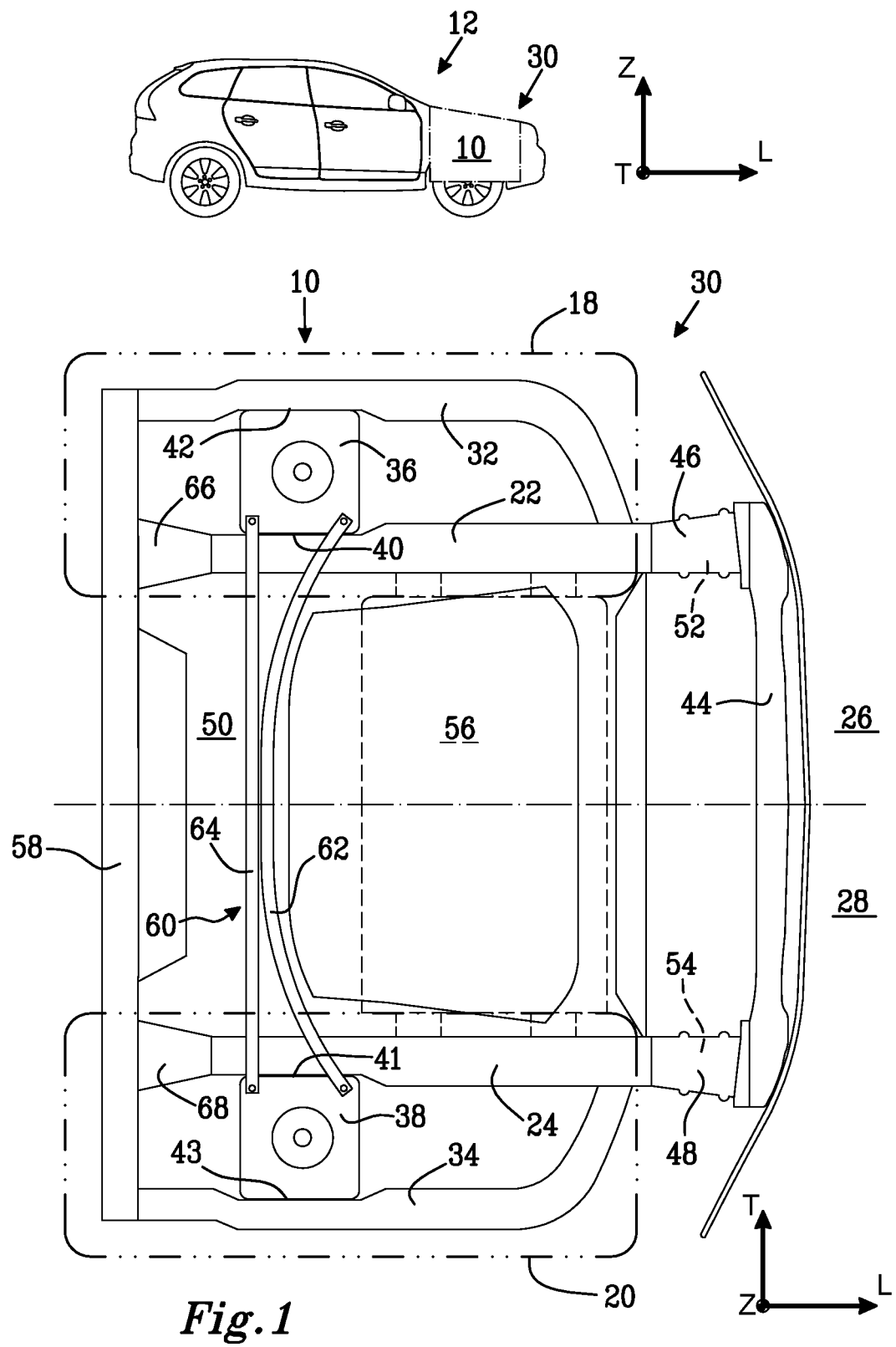
FIG. 1 is a schematic view of a front structure of a vehicle comprising two front structure arrangements according to the disclosure.

FIG. 1 schematically illustrates a front structure 10 of a vehicle 12. FIG. 1 also shows a coordinate system, wherein a longitudinal direction L is in the normal driving direction of the vehicle 12, a transverse direction T is perpendicular to the longitudinal direction L and going sideways or laterally in the vehicle 12 and a vertical direction z is in the height direction of the vehicle 12.

The front structure 10 comprises two front structure arrangements 18, 20 according to the disclosure. Each front structure arrangement 18, 20 comprises a side member 22, 24 arranged in the longitudinal direction L of the vehicle at a respective left-side portion 26 and a right-hand portion 28 of a front portion 30 of the vehicle. Each front structure arrangement 18, 20 further comprises an outer side member 32, 34 arranged in the longitudinal direction L of the vehicle at the left-side portion 26 or the right-hand portion 28 of the front portion 30 of the vehicle. The outer side member 32, 34 is located laterally outward of and vertically above the side member 22, 24. The outer side member 32, 34 is also known as a shot-gun or amazon bar. Each front structure arrangement 18, 20 also comprises a spring tower 36, 38 attached to the side member 22, 24 by a first attachment means 40, 41 and to the outer side member 32, 34 by a second attachment means 42, 43. The spring tower 36, 38 is adapted to support a suspension of the vehicle.

The first attachment means 40, 41 is arranged such that the spring tower 36, 38 is adapted to detach progressively from the side member 22, 24 during bending of the side member 22, 24, when the front structure 10, and thereby the front structure arrangement 18, 20 is subjected to a substantially longitudinal force, e.g., in case of a frontal collision, which is further described below in conjunction with FIGS. 2-4. As an option, also the second attachment means 42, 43 may be arranged such that the spring tower 36, 38 is adapted to detach progressively from the outer side member 32, 34 during bending of the outer side member 32, 34, when the front structure 10, and thereby the front structure arrangement 18, 20 is subjected to a substantially longitudinal force. Alternatively, the second attachment means 42, 43 may be according to prior art.

The front structure 10 may also comprise additional components as in the illustrated embodiment, such as a bumper 44, a pair of crash boxes 46, 48, arranged at a respective front end of the side members 22, 24, a subframe 50, a pair of lower load-path crash boxes 52, 54, arranged at a front end of the subframe 50 vertically below the crash boxes 46, 48, an engine 56, a body back-up structure 58 and/or a rally bar 60.

The rally bar 60 connects the two spring towers 36, 38. The rally bar 60 comprises two bars, a curved front bar 62 and a straight rear bar 64. However, the rally bar 60 itself is an optional component of the front structure 10, and one or both of the front bar 62 and the rear bar 64 may be dispensed with.

The crash boxes 46, 48 have a lower axial strength than the side members 22, 24, i.e., in the longitudinal direction L. The body back-up structure 58 is located at a rear end of the front portion 30. The side members 22, 24 are preferably attached to the body back-up structure 58 by means of triangular supports 66, 68, which form part of the respective side members 22, 24.

Figure 2:
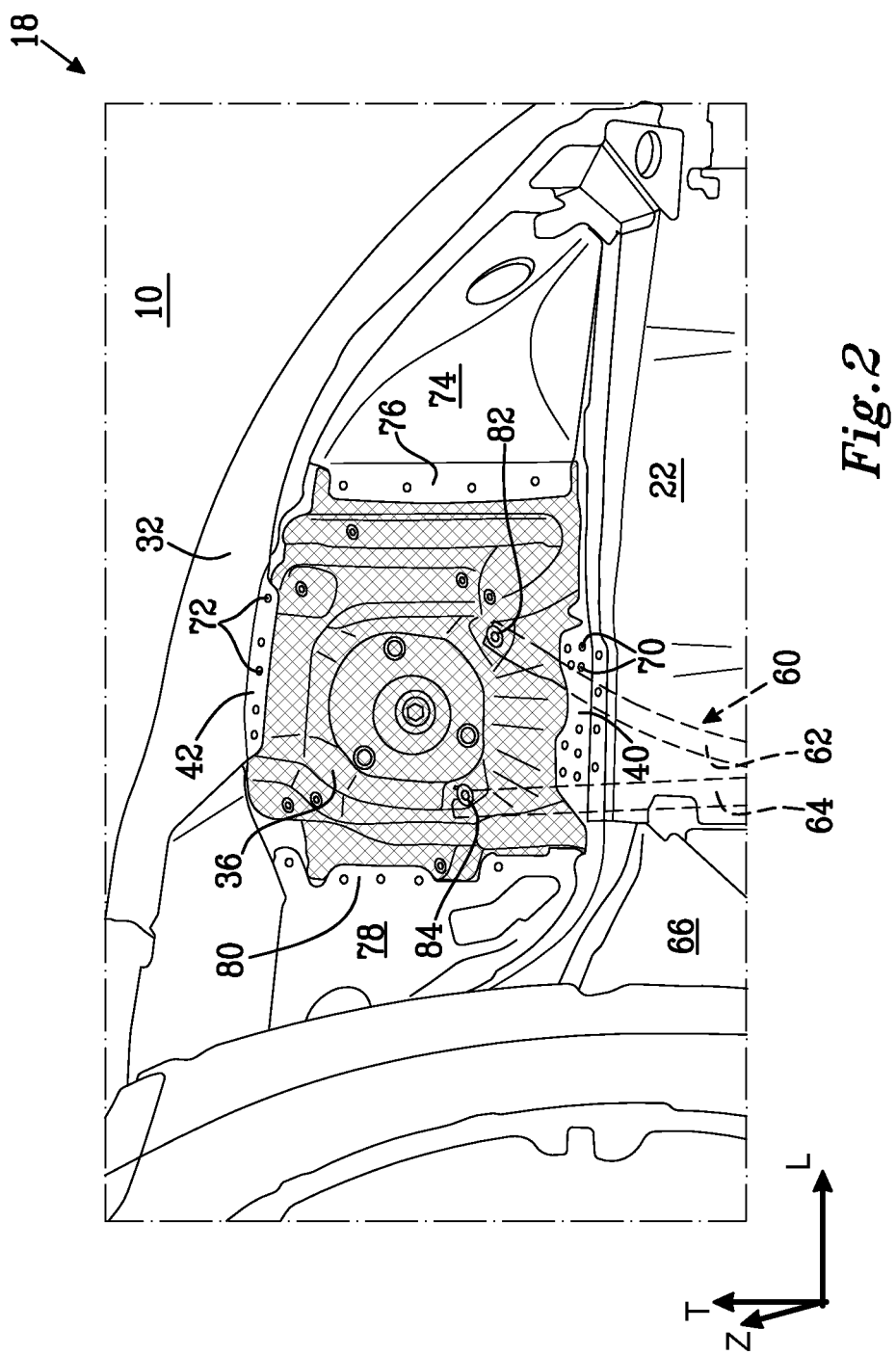
FIG. 2 is a more detailed view of one of the front structure arrangements of FIG. 1.

FIG. 2 is a more detailed view of one of the front structure arrangements showing the left-hand front structure arrangement 18, which is located at the left-hand side 26 of the front structure 10. As mentioned above, the front structure arrangement 18 comprises the side member 22, the outer side member 32 and the spring tower 36. The spring tower 36 is attached by the first attachment means 40 to the side member 22. In the illustrated embodiment, the first attachment means 40 comprises a plurality of discrete attachment members, e.g., rivets 70. Rivets 70 are suitable when the material types of the spring tower and the side member are different, e.g., the spring tower 36 being of aluminum and the side member 22 of steel. The spring tower 36 is further attached by the second attachment means 42 to the outer side member 32. Also the second attachment means 42 comprises a plurality of discrete attachment members, e.g., rivets 72.

As an option, which is illustrated in FIG. 2, the front structure arrangement 18 comprises a front closer 74 at least partly closing the space between the spring tower 36, the side member 22 and the outer side member 32 in front of the spring tower 36. The front closer 74 is attached to the spring tower 36 by a third attachment means 76, which may be according to prior art.

As another option, which is also illustrated in FIG. 2, the front structure arrangement 18 comprises a rear closer 78 at least partly closing the space between the spring tower 36, the side member 22 and the outer side member 32 behind the spring tower 36. The rear closer 78 is attached to the spring tower 36 by a fourth attachment means 80, which may be according to prior art.

As a further option, also illustrated in FIG. 2, the rally bar 60 may connect the spring tower 36 to spring tower 38 at the right-hand side 28. See also FIG. 1. The front rally bar 62 connects a front fixation means 82 of the spring tower 36 to a corresponding front fixation means of the other spring tower 38. The rear rally bar 64 connects a rear fixation means 84 of the spring tower 36 to a corresponding rear fixation means of the other spring tower 38. The front rally bar 62 and the rear rally bar 64 are adapted at at least one of the ends, such that they may easily be released from at least one of the spring towers 36, 38. They may e.g., be designed to easily slip out from the fixation means 82, 84. Preferably, the front rally bar 62 and the rear rally bar 64 are adapted for easy release at both of the ends. As an alternative, or a complement, the front fixation means 82 and/or the rear fixation means 84 may be prepared to easily break, thereby releasing the front rally bar 62 and the rear rally bar 64, respectively, from at least one of the spring towers 36, 38.

Figure 3:
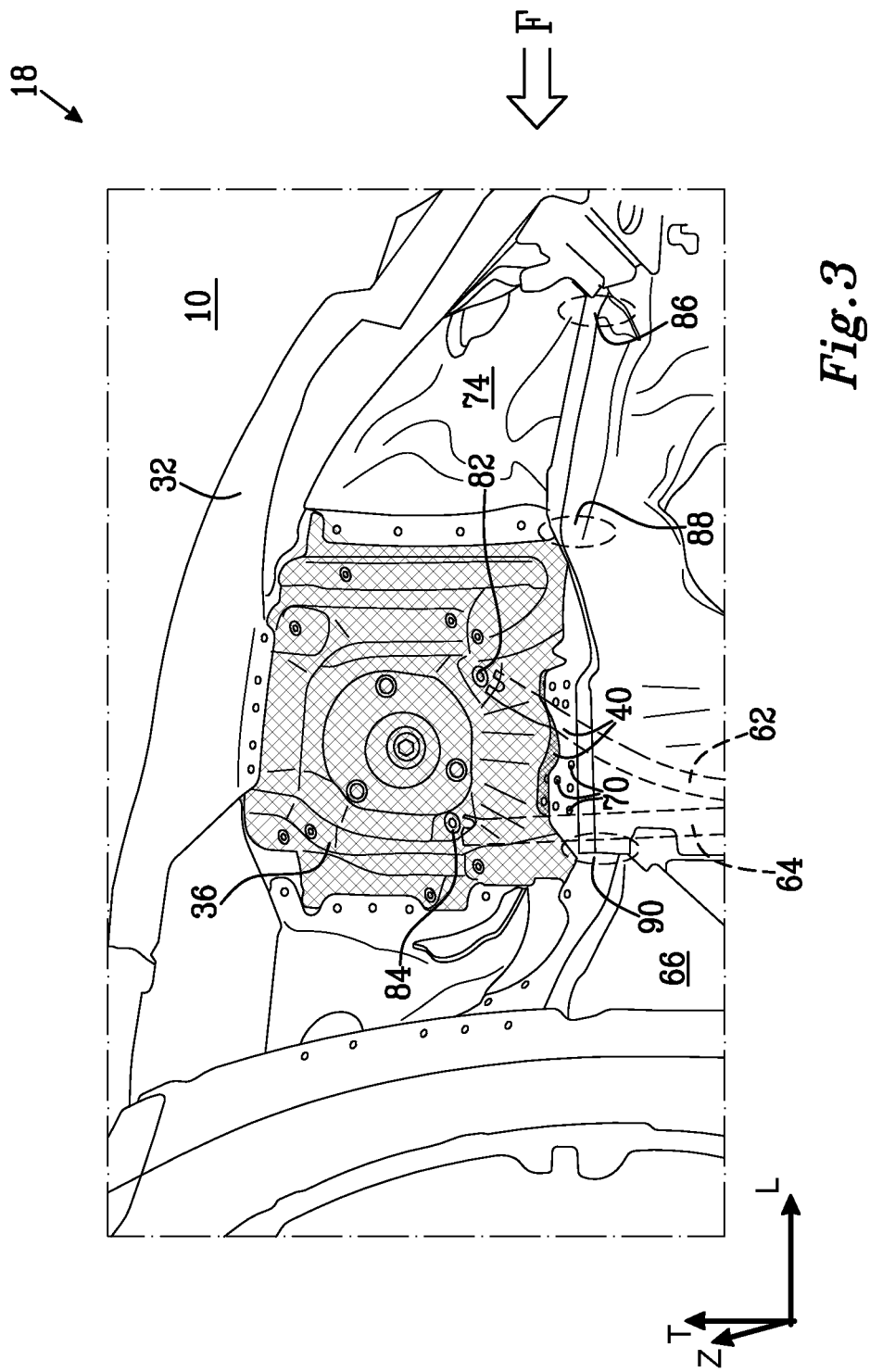
FIG. 3 schematically illustrates what happens when the front structure arrangement of FIG. 2 is subjected to a substantially longitudinal force.

FIG. 3 schematically illustrates what happens with the front structure arrangement 18, when the front structure 10, and thereby the front structure arrangement 18, is subjected to a substantially longitudinal force F, e.g., in case of a frontal collision. FIGS. 3 and 4 illustrate a vehicle comprising the front structure arrangement being subjected to a full frontal barrier impact at 35 mph according to USNCAP.

In a first phase of the frontal collision, front components of the vehicle 12 start to deform, e.g., the bumper 44. Thereafter, or with a small time-wise overlap, the crash boxes 44, 46 and the lower load-path crash boxes 52, 54 deform. These components are not shown in the detailed view of FIG. 3, but may be found in FIG. 1.

Thereafter the side member 22 is affected by the force F. In the illustrated embodiment, which is illustrated in FIG. 3, the side member 22 is arranged, shaped and/or dimensioned to bend substantially laterally, i.e., in the transverse direction T. The triangular support 66 of the side member 22 is used to assist in obtaining the preferred substantial lateral bending. Further, the side member 22 is, as an option, provided with predetermined bend zones, which are arranged to obtain the desired substantially lateral bending. It is beneficial to use an odd number of predetermined bend zones, and in particular three predetermined bend zones 86, 88, 90, as in the illustrated embodiment, since the side member 22 then will bend like a V, thereby helping to displace the stiff spring tower 36, which is more rigid and hence less deformable than the side member 22, laterally outwards. Due to its shape, material and/or material thickness, the triangular support 66 is more rigid than the rest of the side member 22 and thus deforms to a much lesser extent. In particular, the triangular support 66 helps to make the side members 22 bend mainly laterally and not so much, or not at all, vertically.

As a result of the bending of the side member 22, the spring tower 36 starts to detach from the side member 22. The detachment starts at a rearward-facing side of the spring tower 36 and progresses in a forward direction of the vehicle. The progress of the detachment may be step-wise or continuous, e.g., dependent on type and configuration of attachment members 70. The optional rear rally bar 62 releases from the rear fixation means 84, as the spring tower 36 detaches from the side member 22.

If using an uneven number of predetermined bend zones 86, 88, 90, e.g., three as in the illustrated embodiment, the first attachment means 40 may be arranged such that the detachment of the spring tower 36 from the side member 22 starts at an inward predetermined bend zone 90 of the side member 22, i.e., a bend directed towards the longitudinal center line of the vehicle 12. The predetermined bend zones 86, 88, 90 are located such that a predetermined bend zone 90 for inward bending is located at, or in the vicinity of, the rearward-facing side of the spring tower 36. Thereby the detachment may start at the inward bend and eventually, as is illustrated in FIG. 4, there will be a large displacement between the spring tower 36 and the inward bend of the side member 22 at the predetermined inward bend zone 90 as a result of the bending of the side member 22.

In the illustrated embodiment, the force needed to progressively detach the spring tower 36 may be determined by e.g., selecting the number and distribution of the discrete attachment members, i.e., the rivets 70, per area unit and/or by varying the strength of the discrete attachment members, i.e., the rivets 70. First, the rearmost rivet breaks, then the second rearmost rivet and so on. The detachment is in this case step-wise, with each step corresponding to breaking a rivet. The detachment may further be controlled by the location of the predetermined bend zones 86, 88, 90 in relation to the attachment means. It may be appropriate to locate the discrete attachment members, e.g., the rivets 70, such that the predetermined bend zones 86, 88, 90 are free from discrete attachment members 70, since otherwise a discrete attachment member 70 could locally influence the bending properties. Purely as an example, it would be difficult to bend the side member 22 along a vertical line going through a rivet.

When the side member 22 bends, the first attachment means 40 of the spring tower 36 starts to detach. Thereby, the side member 22 is free to bend further, which will detach the spring tower 36 further from the side member 22 along the first detachment means 40. Thereby, the side member 22 is free to bend further and so on.

Figure 4:
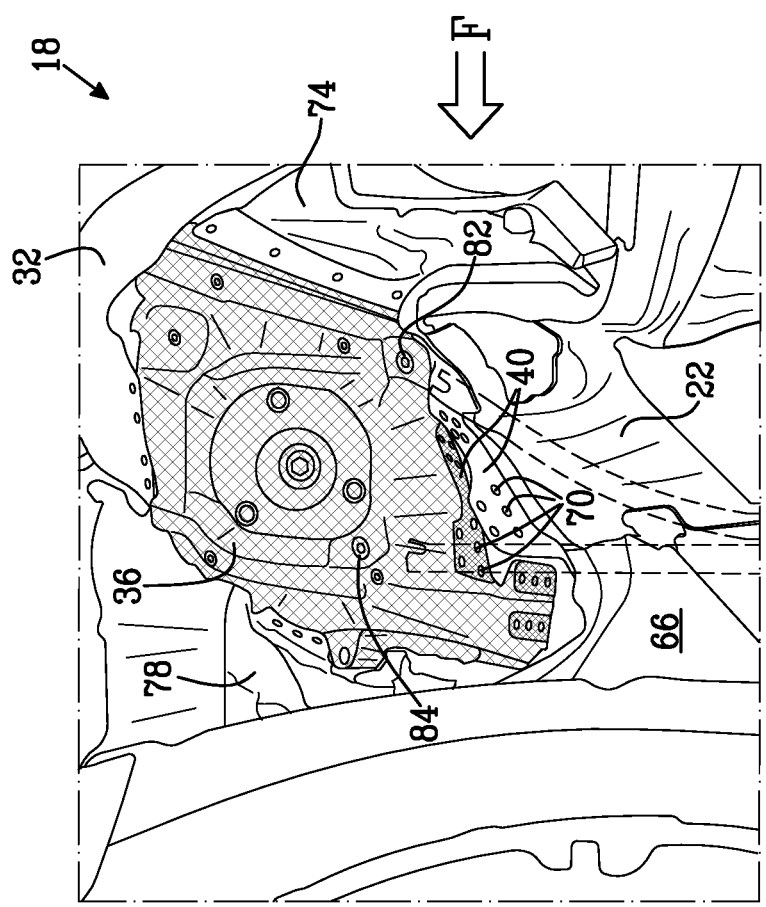
FIG. 4 schematically illustrates the front structure arrangement of FIG. 3 at a later phase, when subjected to the substantially longitudinal force.

FIG. 4 illustrates the situation at a later phase during the frontal collision. The side member 22 has bent much more than in FIG. 3. Thereby it has pushed the spring tower 36 laterally outwards. The spring tower 36 has also been displaced longitudinally rearwards due to the compression of the front structure 10 in the longitudinal direction L and/or the bending of the side member 22. The progressive detachment of the spring tower 36 from the side member 22 has reached a front portion of the spring tower 36. The spring tower 36 has also, at least partly, detached from the outer side member 32 along the second attachment means 42. The front closer 74 and the rear closer 76 are deformed and have detached from the side member 22. The spring tower 36 is more rigid than the side member 22, the front closer 74, the rear closer 76 and the outer side member 32 and is thus less deformed than these. Both the front rally bar 62 and the rear rally bar 64 have released from their respective fixation means 82, 84.

Although FIGS. 2-4 only illustrate the left-hand front structure arrangement 18, it is to be understood that a similar course of events occur at the right-hand front structure arrangement 20 in case of a full frontal collision.

If instead the vehicle 12 is involved in an offset frontal collision, i.e., there is an impact at only a portion of the front structure 10, a similar course of events as described above for FIGS. 2-4 may happen for one of the spring towers 36, 38. The side member 22, 24 at the side portion 26, 28 of the front structure 10 where the impact occurs then bends and thereby displaces the spring tower 36, 38 located at that side portion 26, 28 of the vehicle 12 laterally outwards.

Further modifications of the disclosure within the scope of the appended claims are feasible. As such, the present disclosure should not be considered as limited by the embodiments and figures described herein. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A front structure arrangement of a vehicle, the front structure arrangement comprising:
   a side member arranged in a longitudinal direction of the vehicle at a left-side portion or a right-side portion of a front portion of the vehicle;
   an outer side member arranged in the longitudinal direction of the vehicle at the left-side portion or the right-side portion of the front portion of the vehicle, the outer side member being located laterally outward of and vertically above the side member; and
   a spring tower attached to the side member and to the outer side member, the spring tower being adapted to support a suspension of the vehicle, wherein the spring tower is attached to the side member by an attachment means, which is arranged such that the spring tower detaches progressively from the side member during bending of the side member, when the front structure arrangement is subjected to a substantially longitudinal force.

2. The front structure arrangement according to claim 1 wherein the attachment means is arranged to provide the progressive detachment of the spring tower from the side member starting at a rearward-facing side of the spring tower and progressing in a forward direction of the vehicle.

3. The front structure arrangement according to claim 1 wherein the spring tower is arranged to move at least one of laterally outwards or longitudinally rearwards in relation to the vehicle during bending of the side member.

4. The front structure arrangement according to claim 3 wherein the side member and the spring tower are configured to cooperate such that increased bending of the side member allows further progressing of the detachment of the spring tower, thereby allowing the spring tower to move further laterally outwards, while the further progressing of the detachment of the spring tower allows the side member to increase bending.

5. The front structure arrangement according to claim 1 wherein the spring tower is more rigid than the side member, such that the side member is able to start to bend before the spring tower starts to deform when the front structure arrangement is subjected to the substantially longitudinal force.

6. The front structure arrangement according to claim 1 wherein the attachment means comprises discrete attachment members.

7. The front structure arrangement according to claim 6 wherein the attachment members comprise rivets, screws, bolts or spot-welds.

8. The front structure arrangement according to claim 6 wherein a strength of the attachment means is variable.

9. The front structure arrangement according to claim 6 wherein the strength of the attachment means is variable along the attachment of the spring tower to the side member by varying number and distribution of discrete attachment members per area unit or by varying strength of the discrete attachment members.

10. The front structure arrangement according to claim 1 further comprising a crash box located at a front end of the side member, the side member being arranged, dimensioned or shaped to bend substantially after the crash box has been compressed when the front structure arrangement is subjected to the substantially longitudinal force.

11. The front structure arrangement according to claim 1 wherein the side member is arranged, shaped or dimensioned to at least partly bend laterally in relation to a longitudinal center line of the vehicle.

12. The front structure arrangement according to claim 1 wherein the side member is arranged, shaped or dimensioned to bend more laterally than vertically in relation to a longitudinal center line of the vehicle.

13. The front structure arrangement according to claim 1 wherein the side member comprises a triangular support at its rear end.

14. The front structure arrangement according to claim 1 wherein the side member comprises at least one predetermined bend zone.

15. The front structure arrangement according to claim 14 wherein the side member comprises an uneven number of predetermined bend zones.

16. The front structure arrangement according to claim 14 wherein the side member comprises first, second and third predetermined bend zones, and the attachment means is configured such that detachment of the spring tower starts at the third predetermined bend zone, which is located rearward of the first and second predetermined bend zones.

17. The front structure arrangement according to claim 14 wherein the attachment means comprises discrete attachment members, and the at least one predetermined bend zone is free from the discrete attachment members.

18. The front structure arrangement according to claim 1 further comprising at least one of a front closer located in front of the spring tower or a rear closer located behind the spring tower, the at least one of the front closer or the rear closer being attached to at least one of the spring tower, the side member or the outer side member.

19. A front structure of a vehicle comprising:
   a front structure arrangement according to claim 1 at a left-side portion of a front portion of the vehicle; and
   a front structure arrangement according to claim 1 at a right-side portion of the front portion of the vehicle.

20. The front structure of claim 19 further comprising a bar connecting the spring tower of the left-side portion and the spring tower of the right-side portion, the bar being adapted to be released at at least one end from at least one of the spring towers when at least one of the side members bends.

21. A front structure arrangement of a vehicle, the front structure arrangement comprising:
- a side member arranged in a longitudinal direction of the vehicle at a left-side portion or a right-side portion of a front portion of the vehicle;
- an outer side member arranged in the longitudinal direction of the vehicle at the left-side portion or the right-side portion of the front portion of the vehicle, the outer side member being located laterally outward of and vertically above the side member; and
- a spring tower attached to the side member and to the outer side member, the spring tower being adapted to support a suspension of the vehicle, wherein the spring tower is attached to the side member by an attachment means, which is arranged such that the spring tower is adapted to detach progressively from the side member during bending of the side member, when the front structure arrangement is subjected to a substantially longitudinal force;
- wherein the side member comprises multiple predetermined bend zones, and the attachment means is configured to enable detachment of the spring tower to start at one of the predetermined bend zones that is located rearward of another of the predetermined bend zones when the front structure arrangement is subjected to the substantially longitudinal force.

* * * * *